Jan. 25, 1966    C. W. McCUTCHEN ETAL    3,231,798
LOW INDUCTANCE CAPACITOR
Filed Oct. 13, 1961
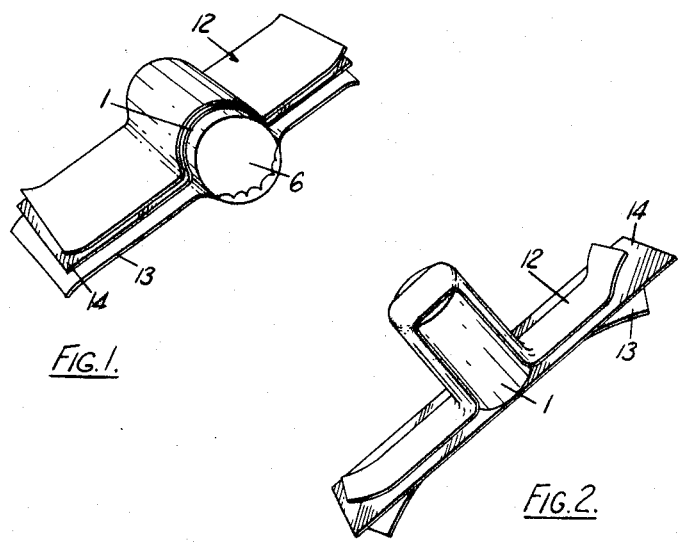
FIG.1.
FIG.2.
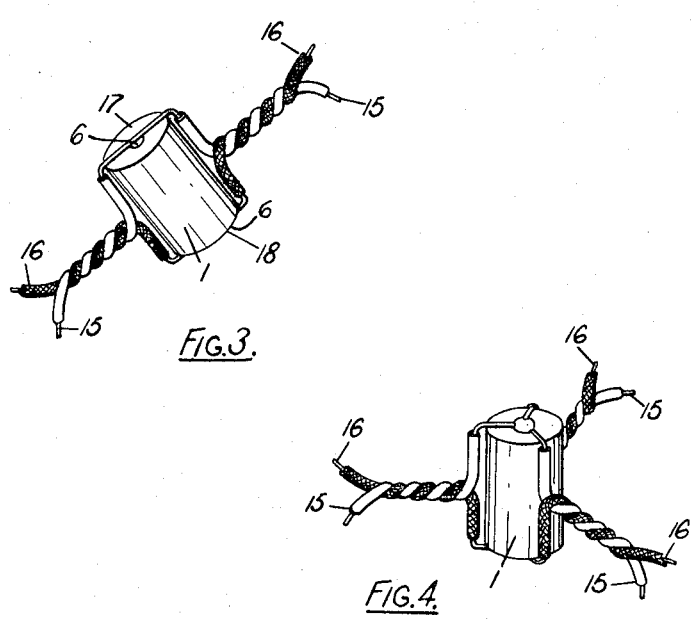
FIG.3.
FIG.4.
Inventors
Charles Walter McCutchen
Ian David Howard
By Stevens, Davis, Miller & Mosher
Attorneys 3,231,798
LOW INDUCTANCE CAPACITOR
Charles Walter McCutchen, c/o Cavendish Laboratory, Cambridge, England, and Ian David Howard, Tallahassee, Fla.; said Howard assignor to said McCutchen
Filed Oct. 13, 1961, Ser. No. 144,870
Claims priority, application Great Britain, Oct. 14, 1960, 35,392/60
6 Claims. (Cl. 317—242)

This invention concerns improvements in or relating to electrical capacitors.

Any practical electrical capacitor, instead of providing a pure capacitance, is a complex circuit involving distributed capacitance, inductance and resistance. When such a capacitor is used in moderate frequency circuits, it can generally be regarded simply as a capacitance in series with a small inductance. Such small inductance can usually be ignored when the capacitor is used for transmitting A.C. voltage signals, since its reactance is negligible compared with the high impedance at which such signals are generally transmitted, and its effects can be minimised or compensated in R.C. and L.C. circuits by suitable choice of the circuit components. However, in circuits for filtration, decoupling and current by-passing, especially in wide-band apparatus, the existence of this small impedance is a disadvantage difficult to overcome.

Various designs of capacitor construction have been produced in an endeavour to reduce the value of this small inductance. Thus, in the case of tubular paper or electrolytic condensers having axial end leads, since most of the inductance lies in the flux linking the circuit completed by these leads, the actual capacitative element of such capacitor (hereinafter called the capacitor element) is generally mounted in a close fitting metal can so as to make the wire leads as short as possible. At the same time, such mounting arrangement reduces the inductance of the capacitor element by reducing the space available for the magnetic field. For a typical metallised capacitor, viz. the 1μf., 250 v. Hunts condenser type w48, A309, the mounting of the capacitor element in this way reduces the inductance by a factor of about 8, e.g. from a value of $50 \times 10^{-9} H$ to about $6 \times 10^{-9} H$. However, the inductance is still too high for many uses.

It is an object of this invention to provide a capacitor construction, particularly suitable for filtration purposes, in which the impedance and the influence of the input and output of the capacitor on one another are reduced as compared with constructions known hitherto.

This invention is characterised in that at least two pairs of leads are connected to the capacitor element, one pair serving as the input and the other pair serving as the output, one of the two plates or sets of plates of the capacitor element being connected to one lead of each pair of leads and the other of the two plates or sets of plates being connected to the other lead of each pair of leads, and in that the two leads of each pair have end portions extending outwardly from the element closely adjacent to, but insulated from, one another and arranged so that the pairs of end portions are spaced from one another, those portions of the leads which connect the said end portions to the capacitor plates lying closely against the outside of the element.

This invention is described with reference to the accompanying drawings, in which:

FIGURES 1, 2, 3 and 4 are perspective views of various forms of capacitor according to this invention.

The capacitor illustrated in FIGURE 1, comprises a capacitor element 1 sandwiched between two metal foil tapes 12 and 13 with the axis of the element extending transversely of the tapes, i.e. parallel to the width thereof, the tapes extending radially outwardly of the capacitor element beyond both sides of the latter in superposed relationship with an insulating tape 14, preferably having adhesive on each side, between them, a central edge portion of tape 13 being connected by crimping and securing, e.g. by soldering, to a metallised terminal plate 6 at one end of the capacitor element 1 and connected to one of the plates or sets of plates of the latter and the central portion of the other tape 12 being similarly crimped and secure to a metallised terminal at the other end of the capacitor element and connected to the other of the plates or sets of plates of this element.

It will be appreciated that one half of the tape 12 and the corresponding half of the tape 13 form one pair of leads, e.g. input leads, connected to the element and the other halves of the tapes 12 and 13 form a second pair of leads, e.g. output leads, connected to the element. These two pairs of leads have end portions which extend radially outwardly from the element 1 on opposite sides thereof and the two pairs of end portions form short lengths of flat transmission lines. The remaining portions of the leads lie closely against the outside of the element and the output and input are thus spaced as far as possible from one another and influence one another as little as possible. Having the end portions of each pair of leads closely adjacent one another and the other portions of the leads lying closely against the capacitor element has the effect of reducing the impedance of the capacitor substantially as compared with the capacitor which could be formed using the same element 1, but providing this with conventional leads.

In the construction shown in FIGURE 2, the capacitor element 1 is similarly sandwiched between two tapes, but, in this construction, the axis of the element is perpendicular to the planes of the outwardly extending end portions of the tapes. This construction is ideal for tantalum pellet electrolytic type condensers, such as the Plessey Castanet type TA 25015, 250μf., 15 v., as the element may simply be mounted between two tapes of a tape transmission line, the latter being moulded tightly around the element so as to reduce or eliminate room for magnetic flux. In one experiment with the Plessey element referred to and mounted as above described, the inductance was measured as being of the order of $5 \times 10^{-10} H$.

In the construction of FIGURE 3, the two pairs of leads are formed by two simple wires 15 and 16 each of which is insulated along all, but a central section, of its length, the central section of wires 15 and 16 being electrically connected to the terminal plates (under an insulated covering and therefore not shown) at ends 17 and 18 respectively of the capacitor element so that the end portions of the wire extend outwardly from opposite sides of the element perpendicularly to the axis thereof, the insulated end portion of the two wires extending from the same side of the element being twisted together.

By taking off more wires or tapes than the two pairs shown in the constructions of FIGURES 1 to 3, it is possible to provide good isolation for three or more circuits. FIGURE 4 shows a capacitor using wire leads as in the construction of FIGURE 3, but wired for three circuits.

In experiments on capacitors according to this invention, the inductive coupling between the input and output was measured as being about $7.5 \times 10^{-10} H$.

In the constructions using tape leads superimposed on one another with insulating tape sandwiched between them, each pair of leads forms a flat, low impedance, transmission line. Such a line may be considered as being magnetically shielded since mutual inductance to neighbouring circuits is very small due to the high reluctance of the long narrow path between the tapes.

Where the capacitor element is of the spiral foil paper or electrolytic type, the leads may be connected directly to the foils, rather than to metallised end plates on the element, since the normal connection in this type of capacitor is made to one point only on each foil. In this case, the foils of the element would require to be mechanically strong. This feature could, of course, be used in the case of other types of capacitor, e.g. metallised or extended foil capacitors, provided that the foils thereof are mechanically strong. However, it produces no advantage as the H.F. circuits are equivalent to the construction in which the leads are connected to metallised end plates.

To protect the capacitors according to this invention, the element and those portions of the leads lying closely against the element may be potted, e.g. by being dipped in melted hard wax or provided with a moulded resin casing, so as to exclude moisture.

We claim:

1. An electrical capacitor comprising an insulated capacitative element; at least one pair of input leads connected to said element and at least one pair of output leads connected to said element; end portions of said input leads extending outwardly from said element closely adjacent to, but insulated from, one another; and end portions of said output leads extending outwardly from said element, at a position thereon remote from said end portions of said input leads, closely adjacent to, but insulated from, one another, substantially the entire lengths of the input and output leads, with the exception of said end portions thereof, lying closely against the exterior surface of said element.

2. The electrical capacitor specified in claim 1, in which the said leads are simple wires covered with an electrical insulation.

3. The electrical capacitor specified in claim 1, in which the leads are metal foil tapes.

4. An electrical capacitor comprising a capacitative element, a metallic terminal plate at each end of said element, a first wire, a central section of said first wire extending across and being conductively secured to, one of said metallic terminal plates, end sections of said first wire extending outwardly from the said element from opposite sides thereof perpendicular to the axis of the element, intermediate sections of said first wire joining the said end sections with the central section, substantially the entire length of said intermediate sections lying closely against the exterior surface of the element, a second wire, a central section of said second wire extending across, and being conductively secured to, the other of said metallic terminal plates, end sections of said second wire extending outwardly from the said element, one adjacent each of the end sections of said first wire, intermediate sections of said second wire joining the said end sections thereof with the central section, substantially the entire length of said intermediate sections lying closely against the exterior surface of the element, and insulating sleeves covering the end sections and intermediate sections of said wires, the adjacent insulating sleeve covered end portions of the two wires being held in contiguous relationship by being twisted together.

5. An electrical capacitor comprising a capacitative element, a metallic terminal plate at each end of said element, two metallic foil tapes between which the element is sandwiched with the axis of the element extending across the tapes, one tape being conductively connected to each of said metallic terminal plates, superposed end portions of the tapes extending beyond the element on both sides thereof and insulating tapes between said superposed tape end portions, defining flat sandwich transmission lines extending from both sides of the element.

6. An electrical capacitor comprising a capacitative element, a metallic terminal plate at each end of said element, two metallic foil tapes between which the element is sandwiched with the axis of the element perpendicular to the planes of the tapes, one tape being conductively connected to each of said metallic terminal plates, superposed end portions of the tapes extending beyond the element on both sides thereof, and insulating tapes between said superposed tape end portions, defining flat sandwich transmission lines extending from both sides of the element.

References Cited by the Examiner

UNITED STATES PATENTS

| | | | |
|---|---|---|---|
| 1,746,469 | 2/1930 | Grunow | 317—260 |
| 2,029,550 | 2/1936 | Albert | 317—260 |
| 2,388,139 | 10/1945 | Grouse et al. | 317—260 |
| 2,531,185 | 11/1950 | Wurster | 317—260 |

FOREIGN PATENTS

| | | |
|---|---|---|
| 1,194,852 | 11/1959 | France. |
| 680,432 | 10/1952 | Great Britain. |
| 727,496 | 4/1955 | Great Britain. |

OTHER REFERENCES

"Electrical Manufacturing," September 1952, page 138.

JOHN F. BURNS, *Primary Examiner.*

LARAMIE E. ASKIN, *Examiner.*